United States Patent
Nieto et al.

(10) Patent No.: US 7,508,884 B2
(45) Date of Patent: Mar. 24, 2009

(54) SYSTEM AND METHOD FOR COMMUNICATING DATA USING CONSTANT AMPLITUDE EQUALIZED WAVEFORM

(75) Inventors: John W. Nieto, Rochester, NY (US); William N. Furman, Fairport, NY (US); Michael A. Wadsworth, Palmyra, NY (US)

(73) Assignee: Harris Corporation, Melbourne, FL (US)

( * ) Notice: Subject to any disclaimer, the term of this patent is extended or adjusted under 35 U.S.C. 154(b) by 590 days.

(21) Appl. No.: 11/088,510

(22) Filed: Mar. 24, 2005

(65) Prior Publication Data

US 2006/0215786 A1 Sep. 28, 2006

(51) Int. Cl.
*H04L 27/00* (2006.01)
*H03K 9/00* (2006.01)

(52) U.S. Cl. ............... 375/295; 375/302; 375/325; 375/329; 375/334; 375/336

(58) Field of Classification Search ............ 375/229, 375/316, 295, 140, 302, 325, 329, 334, 335
See application file for complete search history.

(56) References Cited

U.S. PATENT DOCUMENTS

| | | | | |
|---|---|---|---|---|
| 4,516,087 A | | 5/1985 | Bruene | 332/17 |
| 4,622,683 A | | 11/1986 | Basham et al. | 375/90 |
| 5,020,075 A | * | 5/1991 | Tachika | 375/146 |
| 5,309,474 A | * | 5/1994 | Gilhousen et al. | 370/209 |
| 5,442,625 A | * | 8/1995 | Gitlin et al. | 370/342 |
| 5,673,290 A | * | 9/1997 | Cioffi | 375/260 |
| 5,815,531 A | | 9/1998 | Dent | 375/298 |
| 5,867,059 A | | 2/1999 | Huang et al. | 329/302 |
| 5,909,469 A | * | 6/1999 | Frodigh et al. | 375/302 |
| 5,946,357 A | * | 8/1999 | Sandin et al. | 375/296 |
| 6,026,130 A | * | 2/2000 | Rahmatullah et al. | 375/340 |
| 6,122,293 A | * | 9/2000 | Frodigh et al. | 370/473 |
| 6,188,717 B1 | * | 2/2001 | Kaiser et al. | 375/148 |
| 6,201,451 B1 | | 3/2001 | Hata | 332/100 |
| 6,259,730 B1 | * | 7/2001 | Solondz | 375/232 |
| 6,438,176 B1 | * | 8/2002 | Haran et al. | 375/303 |
| 6,522,665 B1 | * | 2/2003 | Suzuki et al. | 370/471 |
| 6,603,818 B1 | | 8/2003 | Dress, Jr. et al. | 375/295 |
| 6,678,263 B1 | * | 1/2004 | Hammons et al. | 370/342 |
| 6,680,983 B2 | | 1/2004 | Happonen | 375/316 |
| 6,687,507 B2 | * | 2/2004 | Fischer et al. | 455/456.6 |
| 6,690,739 B1 | * | 2/2004 | Mui | 375/265 |
| 6,690,751 B1 | * | 2/2004 | Nikula et al. | 375/341 |
| 6,856,625 B1 | * | 2/2005 | Shamsunder et al. | 370/394 |
| 6,865,233 B1 | * | 3/2005 | Eriksson et al. | 375/261 |
| 6,973,140 B2 | * | 12/2005 | Hoffman et al. | 375/298 |
| 6,987,813 B1 | * | 1/2006 | Demetrescu et al. | 375/295 |
| 2001/0008542 A1 | * | 7/2001 | Wiebke et al. | 375/141 |
| 2001/0033621 A1 | * | 10/2001 | Khayrallah | 375/244 |

(Continued)

*Primary Examiner*—Chieh M Fan
*Assistant Examiner*—Jason M. Perilla
(74) *Attorney, Agent, or Firm*—Allen, Dyer, Doppelt, Milbrath & Gilchrist, P.A.

(57) ABSTRACT

A system communicates data and includes an encoder for encoding communications data with a forward error correction code. A data randomizer randomizes the communications data with a random bit sequence and a combining circuit combines the communications data with known symbols into frames. A modulator maps the communications data into minimum shift keying or Gaussian minimum shift keying (MSK or GMSK) symbols based on a specific mapping algorithm to form a communications signal having an MSK or GMSK waveform over which the communications data can be transmitted.

7 Claims, 6 Drawing Sheets

U.S. PATENT DOCUMENTS

| | | | |
|---|---|---|---|
| 2002/0106032 A1* | 8/2002 | Navarro et al. | 375/259 |
| 2002/0146080 A1 | 10/2002 | Dress, Jr. et al. | 375/316 |
| 2002/0154704 A1* | 10/2002 | Reshef | 375/262 |
| 2003/0063683 A1* | 4/2003 | Shearer et al. | 375/295 |
| 2003/0072353 A1* | 4/2003 | Wengerter et al. | 375/146 |
| 2003/0165199 A1 | 9/2003 | Huang | 375/265 |
| 2004/0057531 A1 | 3/2004 | Rooyen et al. | 375/267 |
| 2004/0081248 A1* | 4/2004 | Parolari | 375/259 |
| 2004/0165681 A1* | 8/2004 | Mohan | 375/322 |
| 2004/0179630 A1* | 9/2004 | O'Shea | 375/305 |
| 2005/0078767 A1* | 4/2005 | Liu | 375/297 |
| 2005/0094711 A1* | 5/2005 | Miller | 375/146 |
| 2005/0250450 A1* | 11/2005 | Olds | 455/42 |
| 2005/0276344 A1* | 12/2005 | Ling et al. | 375/260 |
| 2006/0062326 A1* | 3/2006 | Hoffmann et al. | 375/298 |
| 2006/0215786 A1* | 9/2006 | Nieto et al. | 375/305 |

* cited by examiner

SYSTEM AND METHOD FOR COMMUNICATING DATA USING CONSTANT AMPLITUDE EQUALIZED WAVEFORM

FIELD OF THE INVENTION

The present invention relates to communications systems and, more particularly, the present invention relates to communications systems that use minimum shift keying or Gaussian minimum shift keying modulation.

BACKGROUND OF THE INVENTION

Some multi-band or other tactical radios operate in the high frequency (HF), very high frequency (VHF) (for satellite communications), and ultra high frequency (UHF) bands. The range of these multi-band tactical radios can operate over about 2 through about 512 MHz frequency range. Next generation radios will probably cover about 2.0 to about 2,000 MHz (or higher) to accommodate high data rate waveforms and less crowded frequency bands. This high frequency transmit mode is governed by standards such as MIL-STD-188-141B, while data modulation/demodulation is governed by standards such as MIL-STD-188-110B, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped. These systems usually utilize memoryless modulations, such as a phase shift keying (PSK), amplitude shift keying (ASK), frequency shift keying (FSK), quadrature amplitude modulation (QAM), or modulations with memory such as continuous phase modulation (CPM) and combine them with a convolutional or other type of forward error correction code.

Minimum shift keying (MSK) and Gaussian minimum shift keying (GSMK), together referred to as MSK or GMSK, are a form of frequency shift keying (FSK) used in the Global System for Mobile communications (GSM). The circuits used for implementing such waveforms could include a continuous phase frequency shift keying (FSK) modulator.

Briefly, an MSK modulated signal can be considered as two combined orthogonal signals or channels that are 90 degrees out of phase with each other. Typically, each phase reversal is keyed to represent alternate bits of a binary signal that is to be transmitted. Each keyed pulse period could have a duration of a two bit period that is staggered by a one bit period, and when each channel is phase-shift keyed, it can be amplitude modulated with a one-half sinusoid and combined by addition. Because the sine shaped envelopes of the two channels are 90 degrees out of phase with each other, the sum of the two channels results in a signal with a constant envelope amplitude, which could be amplified by non-linear class-C amplifiers and transmitted. A Gaussian filter having a Gaussian impulse response can be used for prefiltering symbols prior to any continuous phase modulation, thus allowing a Gaussian minimum shift keying.

Many of the radio frequency (RF) power amplifiers used in these communications systems having MSK or GMSK modulation are peak power limited. For example, average power transmitted can be several decibels (dB) less than the peak power capability of an RF amplifier because of the back-off required for the waveform peak-to-average ratio. As a result, a constant amplitude waveform is necessary to address this issue.

A problem encountered in communications systems that use MSK or GMSK modulation is how the systems cope with multipath fading environments when the multipath encountered extends over many symbols. Fading is often caused by reflections and waveform distortion effects caused by variations in signal propagation. MSK or GMSK systems typically use a maximum likelihood sequence estimator (MLSE), also commonly referred to as a Viterbi equalizer, to handle multipath. Unfortunately, the computational complexity of this type of equalizer grows exponentially with the length of the channel. A requirement exists in industry to design and develop constant amplitude waveforms with more multipath capability than could be afforded by Viterbi or MSLE equalizers.

SUMMARY OF THE INVENTION

In view of the foregoing background, it is therefore an object of the present invention to provide constant amplitude waveforms with additional multipath capability, which is also able to track more effectively multipath/fading environments for communications systems that use minimum shift key/Gaussian minimum shift key (MSK or GMSK) modulation.

The present invention advantageously overcomes the problems noted above and combines known and unknown minimum shift keying or Gaussian minimum shift keying symbols that are generated by using a special mapping. This allows demodulation of the waveform using a standard block or symbol equalizer. The minimum shift keying or Gaussian minimum shift keying modulation provides spectral efficiency and constant amplitude, and the known symbols allow the tracking of channel variations. This special mapping allows the use of standard equalizer techniques at a receiver in demodulation of the waveform.

In accordance with the present invention, known and unknown minimum shift keying or Gaussian minimum shift keying symbols can be generated with special data mapping and produce the constant amplitude waveforms that are processed with a standard block or symbol equalizer. The known symbols allow for tracking of channel variations in a multipath/fading environment. The minimum shift keying or Gaussian minimum shift keying modulation provide spectral efficiency and constant amplitude. The special mapping algorithm maps data bits to the minimum shift keying or Gaussian minimum shift keying symbols and allows for the use of enhanced demodulation techniques, such as block or symbol equalizers at a receiver.

In accordance with one aspect of the present invention, the system includes a transmitter for transmitting a communications signal that carries communications data, and includes an encoder for encoding the communications data with a forward error correction code, such as a rate 1/2 convolutional code. A modulator maps the communications data into minimum shift keying/Gaussian minimum shift keying (MSK or GMSK) symbols to form a communications symbol having an MSK or GMSK waveform over which the communications data can be transmitted. A receiver receives the communications signal from the transmitter and includes a filter that is matched to a main pulse of an MSK or GMSK waveform. A block or symbol equalizer equalizes the signal.

In one aspect of the present invention, the block or symbol equalizer can be operative for clamping communications data symbols to a real (+/−1) or imaginary symbols (+/−j). The block or symbol equalizer could be operative for clamping odd communications data symbols to real symbols and clamping even communications data symbols to imaginary symbols or the reverse. The transmitter could also include a block interleaver for interleaving the communications data after encoding. A data randomizer can randomize the communications data with a random bit sequence and extract communications data after the block interleaver is full. A combining circuit is able to combine the communications data with known symbols into frames. This combining circuit can be operative for combining the communications data with unknown symbols into frames.

A method of the present invention is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously provides a system and method that produces a constant amplitude waveform that can be demodulated with standard block or symbol equalizers when using known and unknown minimum shift keying (MSK) or Gaussian minimum shift keying (GMSK) symbols that are generated with a special data to MSK or GMSK symbol mapping. The MSK or GMSK modulation system provides spectral efficiency and constant amplitude. Known symbols allow for the tracking of channel variations in a multipath/fading environment. This special mapping can take data bits and map them to MSK or GMSK symbols, allowing the use of standard demodulation techniques such as block or symbol equalizers at the receiver.

The present invention also overcomes the problem when RF power amplifiers are peak power limited in communications systems that use filtered 2-PSK modulation (where filtering is used to constrain the bandwidth of the 2-PSK waveform to a desired value). In these cases, the average power transmitted can be several dB less than the peak power capability of an RF amplifier because of the back-off required for the waveform peak-to-average ratio. The use of constant amplitude waveforms such as MSK or GMSK of the present invention desirably solves this issue.

The present invention also overcomes the problems encountered in industry when communications systems attempt to cope in multipath/fading environments, when the multipath encountered extends over many symbols. MSK or GMSK modulation systems usually use a maximum likelihood sequence estimator, also known as a Viterbi equalizer, to handle multipath. The computational complexity of this approach, however, grows exponentially with the length of a channel. The system and method of the present invention implements constant amplitude waveforms with more efficient multipath capability, which are able to effectively track multipath/fading environments.

Figure 1:
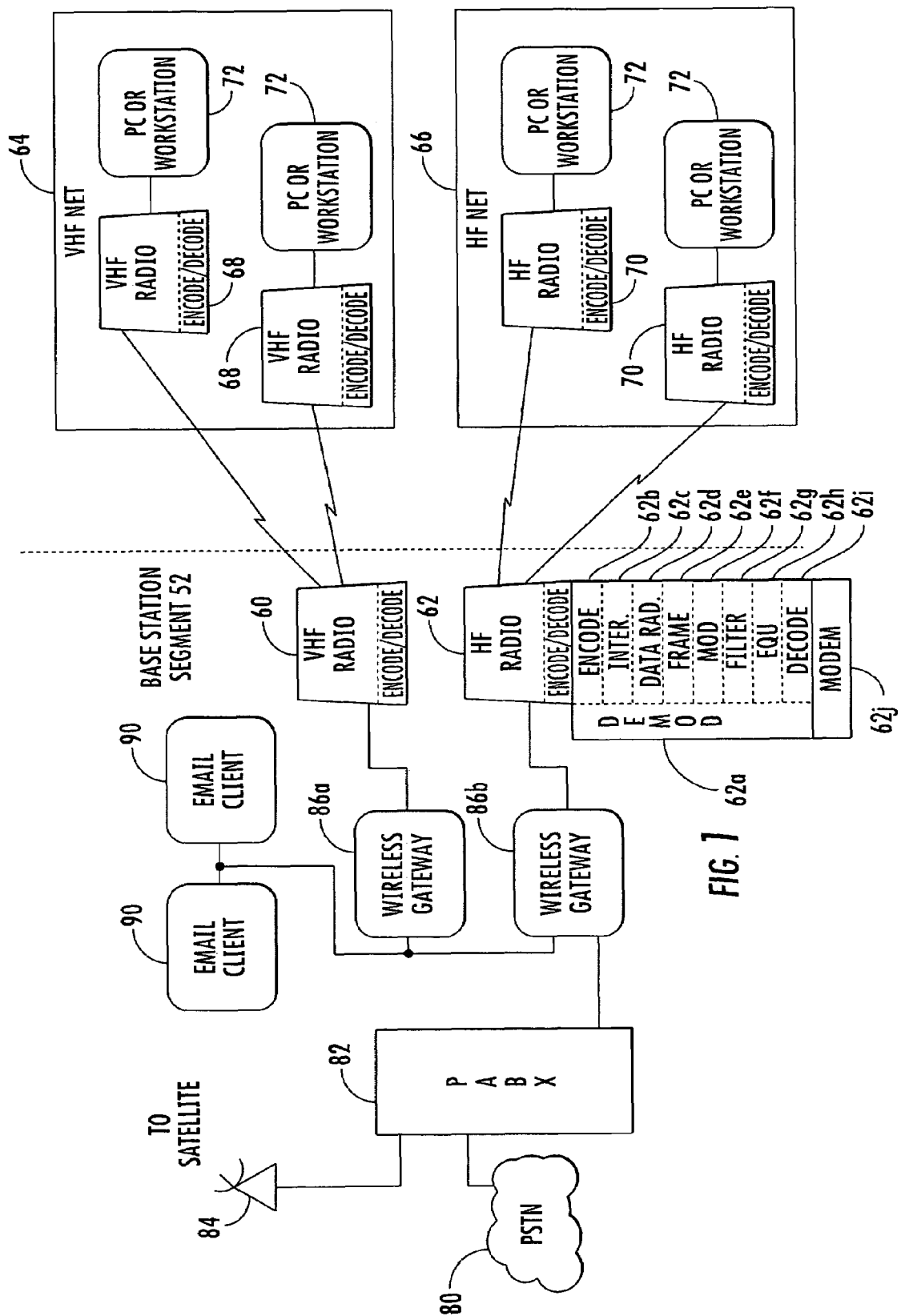
FIG. 1 is block diagram of a communications system that can be used for the present invention as a non-limiting example.

For purposes of description, some background information of coding, interleaving, and an exemplary radio system that can be used for the present invention is now set forth with regard to FIG. 1.

Figure 2:
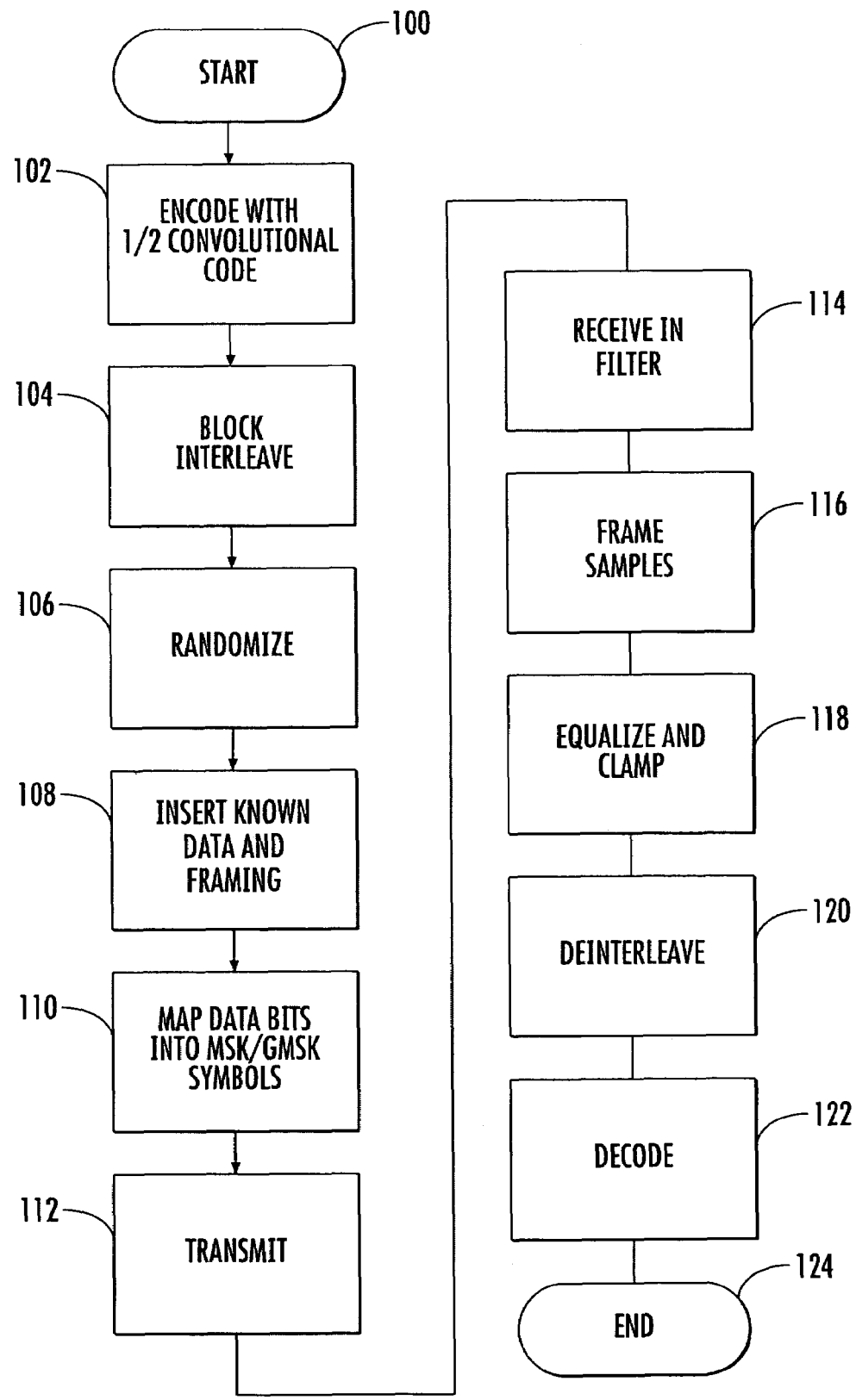
FIG. 2 is a high level flow chart showing basic steps used in practicing an example of the present invention.

For purposes of description only, a brief description of an example of a communications system that would benefit from the present invention is described relative to a non-limiting example shown in FIG. 2. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. The HF radio can include a demodulator circuit 62*a* and appropriate convolutional encoder circuit 62*b*, block interleaver 62*c*, data randomizer circuit 62*d*, data and framing circuit 62*e*, modulation circuit 62*f*, matched filter circuit 62*g*, block or symbol equalizer circuit 62*h* with an appropriate clamping device, deinterleaver and decoder circuit 62*i* and modem 62*j* as non-limiting examples. These and other circuits operate to perform the functions necessary for the present invention. Other illustrated radios can have similar circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

FIG. 2 is a high level flowchart of an example of the steps that can be used in the system and method of the present invention. For purposes of description, the blocks begin in the 100 series. The process begins (block 100) and communications data is encoded with a forward error correction code, e.g., a rate 1/2 convolutional code (block 102). The communications data is block interleaved (block 104) and randomized (block 106). Known data and framing is inserted (block 108) and the data bits mapped into MSK or GMSK symbols (block 110). The communications signal is transmitted (block 112) and received in an MSK or GMSK matched filter (block 114). Frame samples are processed (block 116) and equalizing and clamping occurs (block 118). The communications data is deinterleaved (block 120) and decoded (block 122). The process ends (block 124).

Figure 3:
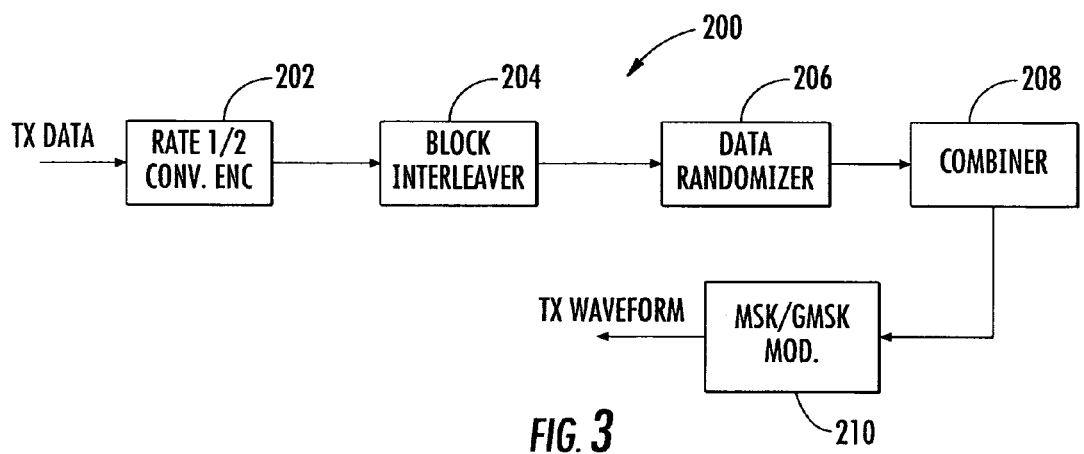
FIG. 3 is a block diagram of a transmitter circuit used for generating a constant amplitude equalized waveform in accordance with the present invention.

FIG. 3 is a block diagram of an example of the transmitter circuit 200 that can be used in accordance with the present invention. As shown, transmitted data is received within a rate 1/2 convolutional encoder circuit 202, for example, using a forward error correction (FEC) code, and then interleaved within a block interleaver circuit 204. The invention could use any forward error correction code, however. Datum is randomized by next processing data within a data randomizer circuit 206. Known data and framing is inserted within a combining circuit 208 and later modulated and processed to MSK or GMSK mapping within modulator circuit 210. The transmitted waveform has a constant amplitude.

As mentioned above, in the present invention, known and unknown data symbols are combined with an MSK or GMSK modulation at the mapping or modulator circuit 210. In the example system shown in FIG. 3, transmitted (user) data is encoded using the rate 1/2 convolutional encoder 202, followed by block interleaving in block interleaver 204. When the interleaver 204 is full, data bits are extracted from interleaver and passed to the data randomizer 206. This logic and processing circuit 206 "xors" the incoming bits with a random bit sequence. After randomization, the data bits are combined at the combiner circuit 210 with known symbols into frames (for example, 20 unknown, i.e., data bits, and 20 known bits to create a 40 bit frame. The signal is passed to a special modulation circuit 210 where the bits are mapped into MSK or GMSK symbols.

Figure 4:
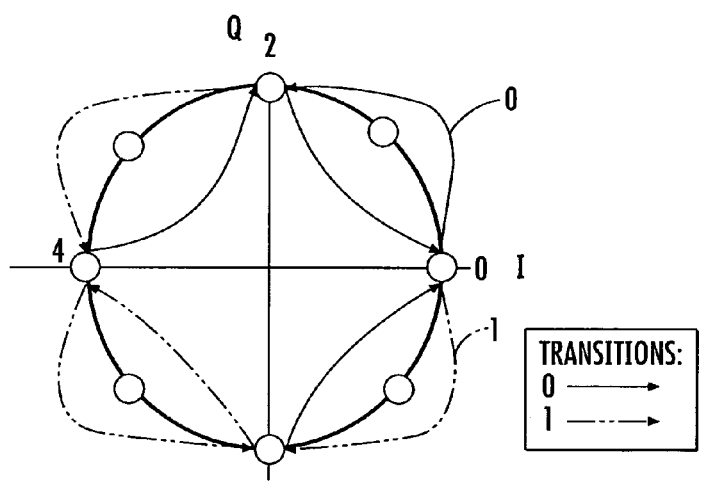
FIG. 4 is a graph showing an example of results for the mapping on data bits to generate MSK/GMSK symbols in accordance with the present invention.

FIG. 4 is a graph showing the special mapping performed on the data bits to generate the MSK or GMSK symbols. Zero and 1 transitions are illustrated. A mapping where 1's become 0's and vice-versa is also allowable.

It should be noted that the use of a rate 1/2 forward error correction (FEC) code and the specific frame format highlighted in this non-limiting example are only illustrative for purposes of explanation, and a different frame size could be used depending on the desired multipath/fading capability of the waveform.

Figure 5:
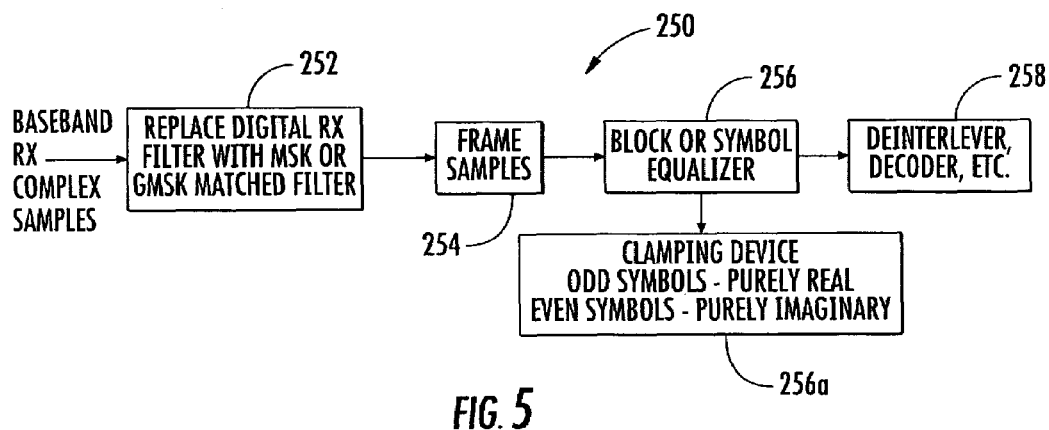
FIG. 5 is block diagram showing basic components of a receiver circuit used for receiving and processing a constant amplitude equalized waveform in accordance with an example of the present invention.

The present invention is also advantageous because only minor modifications are required at a more conventional receiver for the present system to operate and function adequately in the field. FIG. 5 illustrates basic changes to a more conventional receiver 250 that can be implemented. One change would replace the standard digital receive filter, which is typically a square-root Nyquist filter, with a filter 252 matched to the main pulse of the MSK or GMSK waveform. After the received signal is processed in the matched filter 252, frame samples are processed in circuit 254 and the signal is block or symbol equalized within the equalizer 256, followed by deinterleaving and decoding at subsequent circuits illustrated by block 258.

Another receiver modification of the present invention shown in FIG. 5 is a modification to the clamping device 256a in the block or symbol equalizer 256 to clamp to either a purely real symbol (+/−1) or to clamp to a purely imaginary symbol (+/−j), depending on the location of the symbol in a frame currently being processed. The clamping can be accomplished by different means.

In the example explained above for a clamping device 256a, it is assumed that there is a starting phase of 0 degrees for a MSK or GMSK modulator and an even number of bits in a frame. An example of this modulation technique could be simulated using the following parameters: Rate 1/2 convolutional FEC with a 4.8 second interleaver (per US MIL-STD-188-110B), frame size 20 unknown (i.e. data) bits, 20 known bits, simulated for a symbol rate of 2400 symbols/second, noise bandwidth of 3000 Hz.

Figure 6:
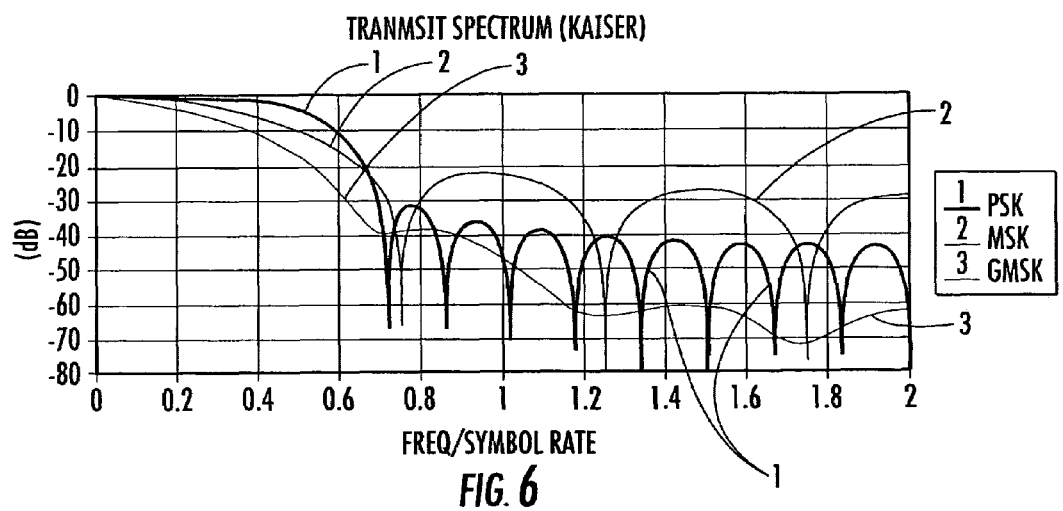
FIG. 6 is a graph showing an example of the transmit power spectrum calculated for standard PSK, MSK and GMSK orthogonal modulation in accordance with an example of the present invention.

The transmit power spectrum was calculated for standard PSK, MSK and GMSK and is shown in the graph of FIG. 6.

The 99% power bandwidths and the Peak Power/Average Power ratios for the three approaches shown in this graph above are:

PSK 1.17 (2803 Hz)–3.6 dB PEP/AVE
MSK 1.27 (3054 Hz)–0 dB PEP/AVE
GMSK 0.90 (2180 Hz)–0 dB PEP/AVE

The corresponding bandwidth reduction afforded by the GMSK approach can be beneficial in a number of different ways. The symbol rate could be increased, providing faster throughput by decreasing the transmission time. Alternatively additional known symbols can be inserted for improved channel tracking.

Figure 7:
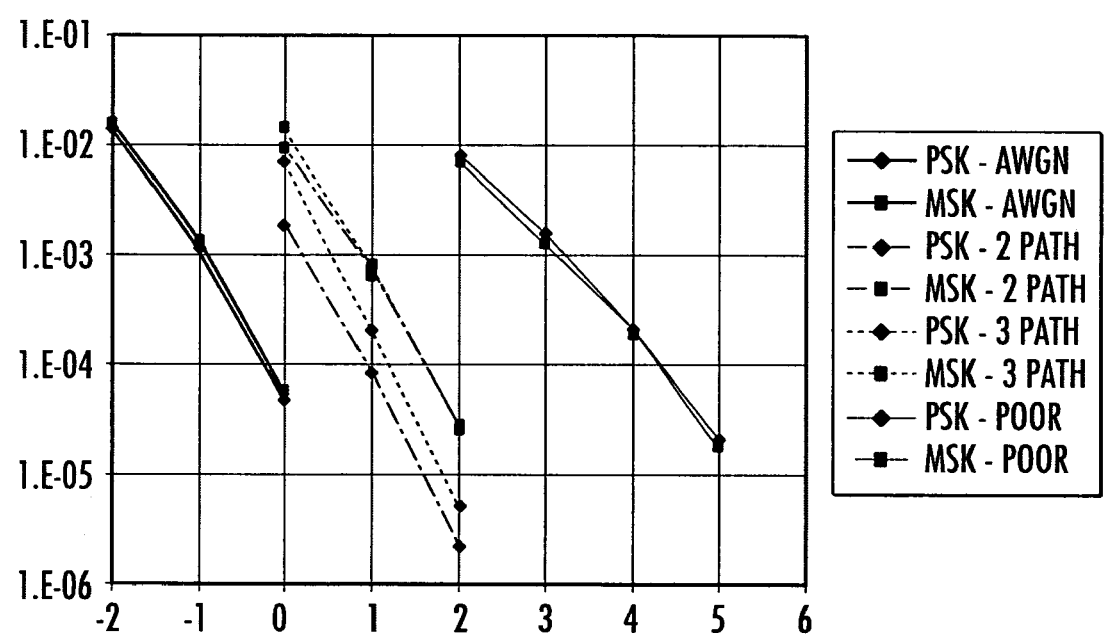
FIG. 7 is a graph showing the MSK bit error rate performance versus the signal-to-noise ratio in a 3 KHz example of the present invention.
Figure 8:
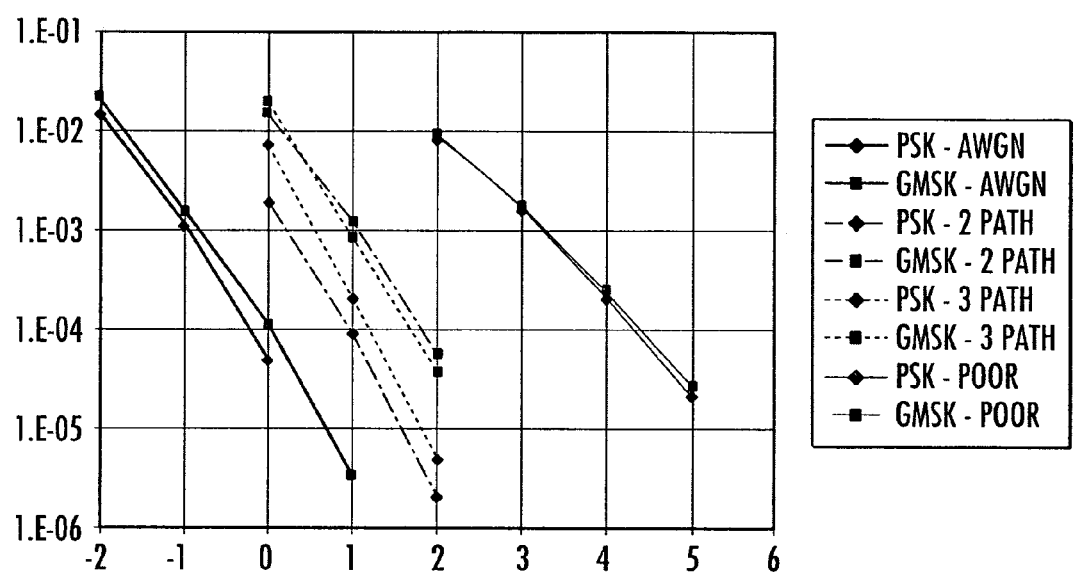
FIG. 8 is a graph similar to FIG. 6 but showing the GMSK bit error rate performance versus the signal-to-noise ratio in a 3 KHz example of the present invention.

FIGS. 7 and 8 are graphs presenting the performance of the new constant amplitude equalized waveforms (one using MSK and one using GMSK), which compare to the single-carrier filtered 2-PSK 600 bps long interleaver waveform of US-MIL-STD-188-110B. As illustrated, FIG. 7 shows the MSK bit error rate (BER) performance versus the signal-to-noise ratio (SNR) in a 3 KHz example while FIG. 8 shows the GMSK BER performance versus SNR in another 3 KHz example.

The 2 Path channel is 2 non-fading equal power paths separated by 2 ms. The 3-Path channel is 3 non-fading equal power paths with separation of 1 ms between each path (0, 1, 2 ms). The Poor channel is the CCIR Poor channel which is two equal power paths separated by 2 ms and each path fading independently at a rate of 1 Hz.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating data, which comprises:
a transmitter for transmitting a communications signal that carries communications data, and including an encoder for encoding the communications data with a forward error correction code, a single interleaver for interleaving the encoded communications data in a serial data stream, a data randomizer that extracts bits from the interleaver corresponding to the communications data and processes the extracted bits with a random bit sequence, a combining circuit for combining the communications data processed with the random bit sequence with known symbols into frames, and a modulator for mapping the framed communications data from the combining circuit into minimum shift keying or Gaussian minimum shift keying (MSK or GMSK) symbols based on a specific mapping algorithm without spread spectrum modulation to form a communications signal having a constant amplitude MSK or GMSK waveform over which the communications data can be transmitted; and
a receiver for receiving the communications signal from the transmitter, and including a filter that is matched to a main pulse of the MSK or GMSK waveform and a block or symbol equalizer for equalizing the communications signal, and further comprising a block or symbol equalizer and a clamping circuit operative for clamping received communications data symbols of the communications signal to a real symbol (+/−1) or an imaginary symbol (+/−j) such that odd communications data symbols are clamped to a one of the real symbols or the imaginary symbols and even communications data symbols are clamped to the other one of the real symbols or the imaginary symbols depending on the starting phase of MSK or GMSK.

2. A system according to claim 1, wherein said interleaver further comprises a block interleaver for interleaving the encoded communications data.

3. A system according to claim 2, wherein said data randomizer is operative for extracting bits from the interleaver after said block interleaver is full.

4. A system according to claim 1, wherein said encoder is operative for encoding the communications data with a rate 1/2 convolutional code.

5. A method for communicating data, which comprises:
at a transmitter, encoding communications data in an encoder with a forward error correction code;
interleaving in a single interleaver the encoded communications data;
extracting bits from the interleaver corresponding to the communications data and processing the extracted bits with a random bit sequence;
combining the communications data processed with the random bit sequence with known symbols into frames;
mapping the framed communications data from the combining circuit into minimum shift keying or Gaussian minimum shift keying (MSK or GMSK) symbols based on a specific mapping algorithm without spread spectrum modulation to form a communications signal having a constant amplitude MSK or GMSK waveform over which the communications data can be transmitted;
transmitting the communications signal to a receiver; and
receiving the communications signal with a matched filter of the receiver that is matched to a main pulse of the MSK or GMSK waveform and equalizing the communications signal within a block or symbol equalizer having a clamping circuit for clamping received communications data symbols of the communications signal to a real symbol (+/−1) or an imaginary symbol (+/−j) such that odd communications data symbols are clamped to a one of the real symbols or the imaginary symbols and even communications data symbols are clamped to the other one of the real symbols or the imaginary symbols depending on the starting phase of MSK or GMSK.

6. A method according to claim 5, which further comprises interleaving the encoded communications data in a block interleaver.

7. A method according to claim 6, which further comprises extracting bits from the interleaver for randomizing after the block interleaver is full.

* * * * *